United States Patent [19]

Dunegan

[11] 4,000,989
[45] Jan. 4, 1977

[54] METHOD AND APPARATUS FOR ELIMINATING AIR FROM LIQUID FLOW STREAMS

[75] Inventor: Ronald G. Dunegan, Katy, Tex.

[73] Assignee: M & J Valve Company, Houston, Tex.

[22] Filed: Nov. 24, 1975

[21] Appl. No.: 634,781

[52] U.S. Cl. .................................... 55/18; 55/166
[51] Int. Cl.² ........................................ B01D 19/00
[58] Field of Search .......... 55/20, 21, 18, 164–170, 55/189, 182, 190, 193, 194

[56] References Cited
UNITED STATES PATENTS

| | | | |
|---|---|---|---|
| 3,355,862 | 12/1967 | Blanchet et al. | 55/170 X |
| 3,403,522 | 10/1968 | Henry | 55/189 X |
| 3,932,150 | 1/1976 | Komai et al. | 55/20 X |

Primary Examiner—Frank A. Spear, Jr.
Assistant Examiner—E. Rollins Cross
Attorney, Agent, or Firm—Flehr, Hohbach, Test, Albritton & Herbert

[57] ABSTRACT

A method and apparatus for removal of free gas (e.g., air) from liquid flowing under pressure through piping. The invention is particularly useful when the flow is being measured by a meter of the turbine or positive displacement types. A closed pressure tank is connected in the flow piping and is provided with means for controlled venting of air from the upper tank portion. Preferably the flow of liquid is interrupted when the volume of air in the tank becomes excessive, and the flow is restored after sufficient gas has been vented from the tank to ensure normal operation.

6 Claims, 8 Drawing Figures

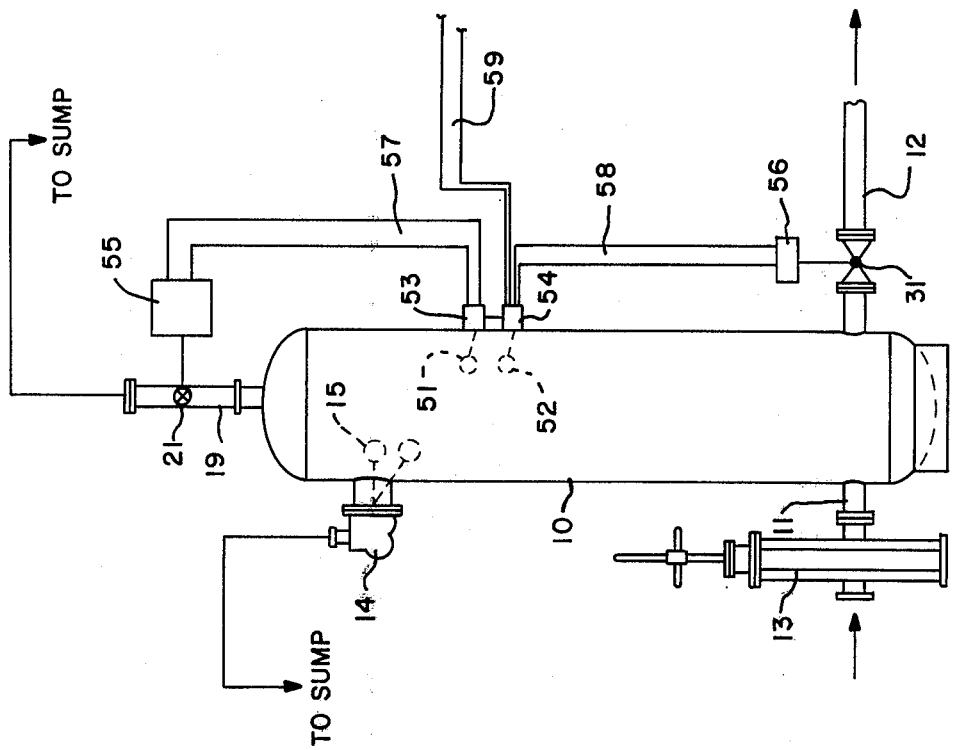
FIG.—2
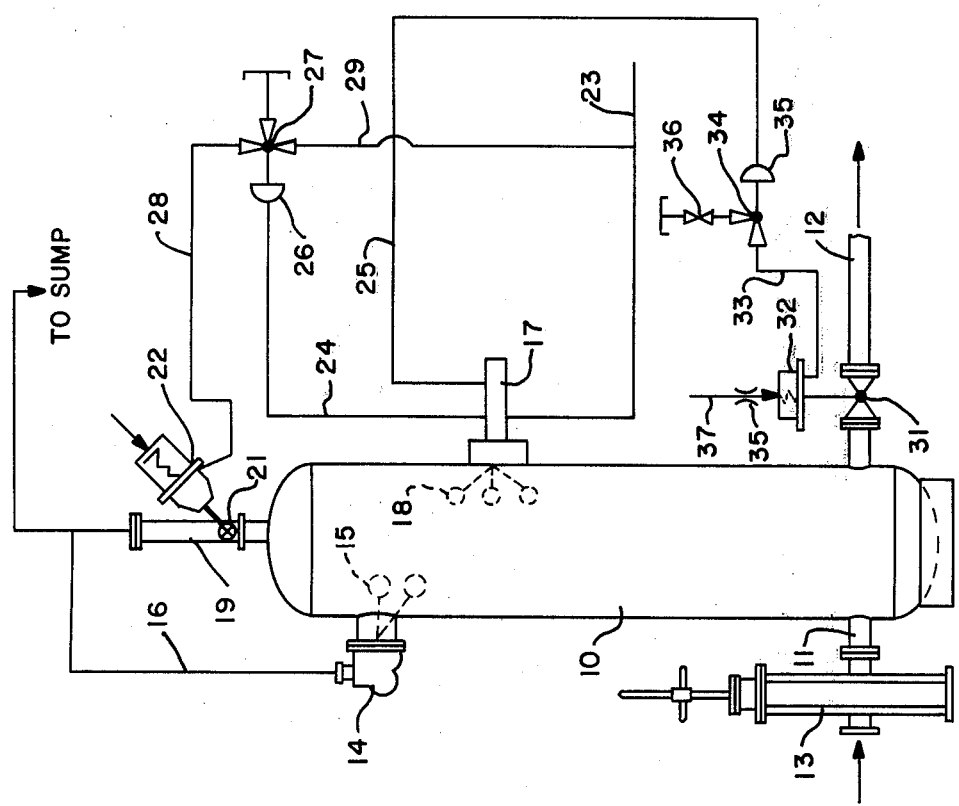
FIG.—1

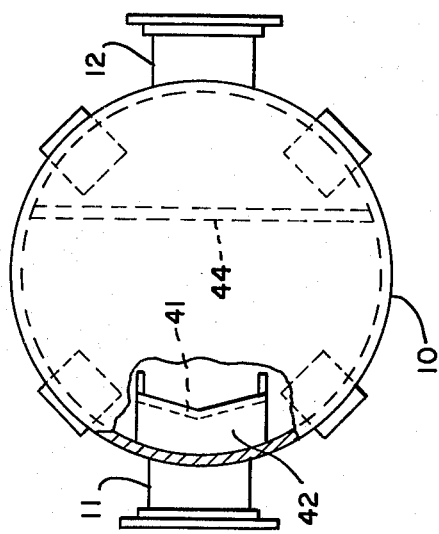
FIG.—5
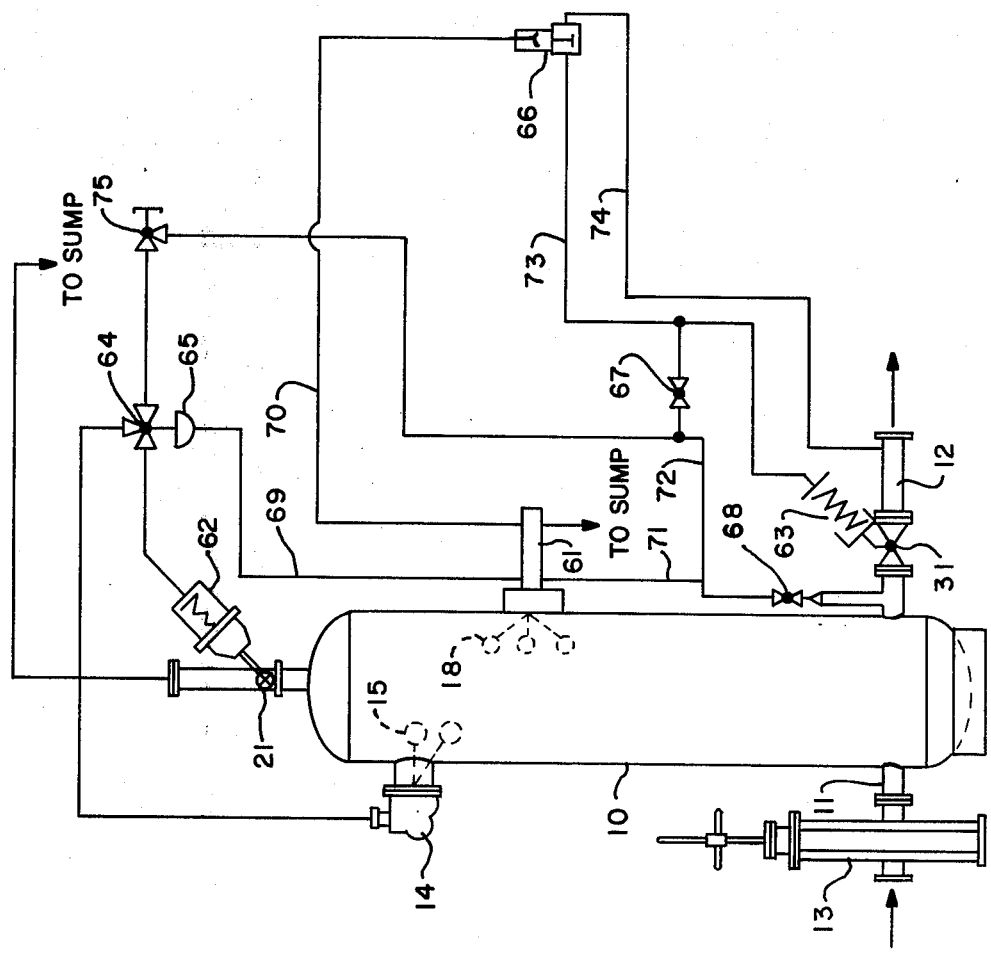
FIG.—3

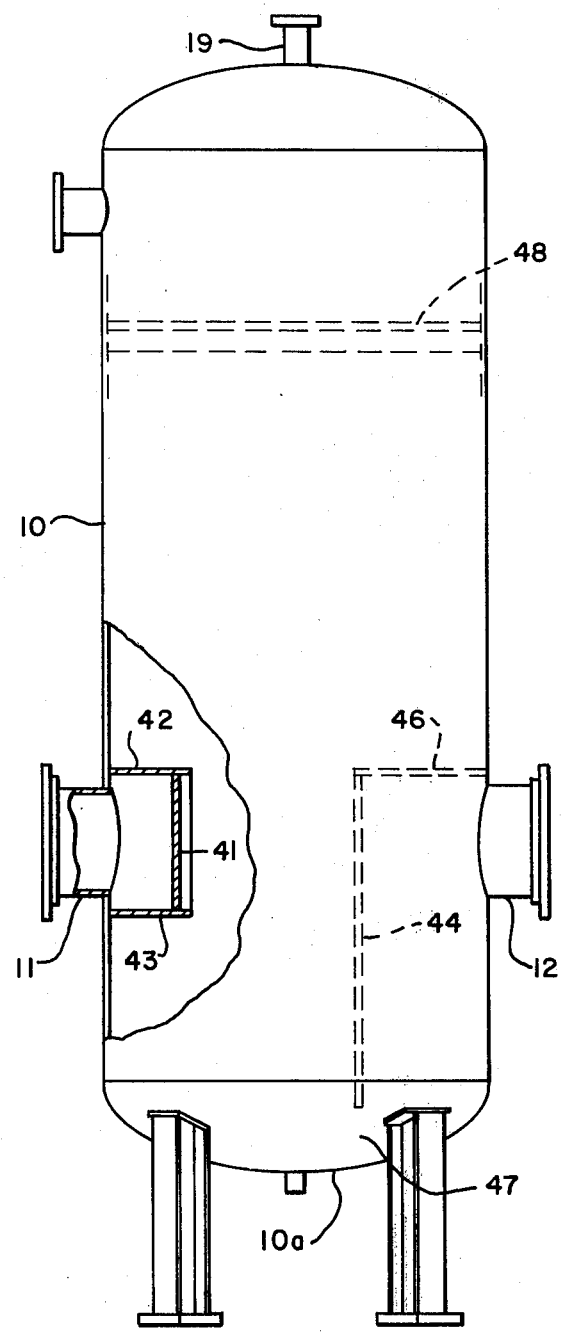
FIG.—4
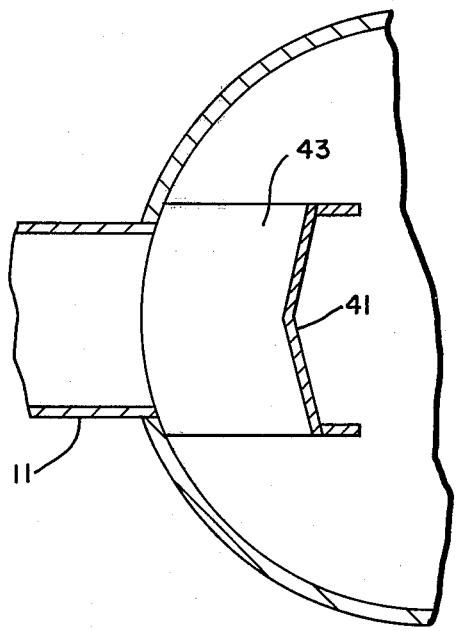
FIG.—6
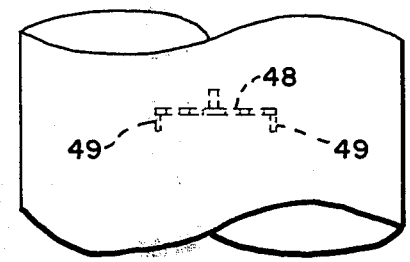
FIG.—7
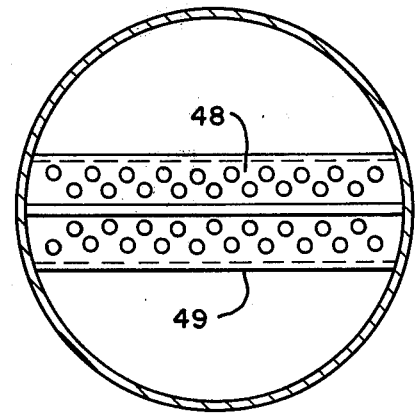
FIG.—8

METHOD AND APPARATUS FOR ELIMINATING AIR FROM LIQUID FLOW STREAMS

BACKGROUND OF THE INVENTION

This invention relates generally to methods and apparatus for the elimination of free air or other gas from liquid flowing under pressure through piping. It is particularly applicable where the liqud flow is being metered.

In various industries handling flow of liquids under pressure, free air or other gas finds its way into the flow stream. An example is in the unloading of petroleum tankers by the use of shipboard pumps which discharge the liquid under pressure through piping to a shore installation. Due to operating procedures at the time of start-up of the pump and during stripping, large volumes of free air may be introduced into the piping. When it is desired to measure the product, as by the use of meters of the positive-displacement or turbine types, it will be evident that the presence of free air in the discharging liquid makes impossible accurate measure of the liquid product. In addition it may cause injury to the metering apparatus.

One method which has been used to eliminate free air from ship off-loading systems is to deliver the flow into relatively large shore tanks where it is permitted to stand under quiescent conditions at atmospheric pressure for a period such as from 2 to 4 hours, to permit dissipation of free air. The liquid in the tank may then be gauged to obtain a measurement of the quantity. This has the disadvantage in that it involves measurement in batch quantities, and in addition it is well-known that the gauging of large tanks involves inaccuracies. In addition, such large shore tanks are relatively expensive.

Another method which has been used is to employ relatively large retention or relaxation tanks into which the liquid is charged from the shipboard pump, and from which the liquid is pumped through a measuring meter. This method requires the use of a second pump to deliver the liquid from the retention tank to the meter, and again it involves the expense of a relatively large retention tank.

SUMMARY OF THE INVENTION

It is an object of the present invention to provide a method and apparatus for the elimination of air or other gases from liquid flowing under pressure through piping, without the use of storage or relatively large retention tanks, and without loss of liquid pressure.

Another object is to provide a method and apparatus which serves to effectively eliminate free air or other entrained gas from liquid being delivered under pressure through piping to a flow meter (e.g., turbine or positive displacement types). The invention eliminates the use of large storage or retention tanks and makes possible immediate measurement of the liquid as it is being pumped from a facility where air may be introduced into the flow, as for example, in ship-to-shore unloading operations.

Another object is to provide a method and apparatus which arrests flow when the operation approaches a condition conducive to incomplete air elimination, and which restores the liquid flow after the condition has been restored to normal.

In general, the invention consists of an upright pressure tank having its lower portion connected between inflow or upstream and outflow or downstream portions of piping. Liquid flow under pressure through the piping is caused to flow through the pressure vessel where it is maintained under static pressure comparable to that in the piping. Gas which has separated from the liquid within the pressure tank is collected in and vented from the upper portion of the tank by the use of venting means which is controlled in accordance with the level of liquid within the tank. The flow of liquid from the pressure tank through the outflow piping is interrupted when the volume of gas in the tank becomes excessive and the amount of liquid in the tank at a minimum safe value, and the flow is restored when sufficient gas has been vented from the tank to ensure that no free gas passes out with the liquid. Also the invention comprises apparatus for carrying out the foregoing method, the various control operations being carried out in an automatic manner.

Additional objects and features of the invention will appear from the following description in which the preferred embodiments have been set forth in detail in conjunction with the accompanying drawing.

BRIEF DESCRIPTION OF THE DRAWING

FIG. 1 is a schematic view illustrating suitable apparatus for carrying out the method. The apparatus in this instance makes use of pneumatic control means;

FIG. 2 is a schematic view illustrating apparatus for carrying out the method, the apparatus in this instance having electrical control means;

FIG. 3 is a schematic view similar to FIG. 1 but illustrating apparatus having hydraulic control means;

FIG. 4 is a side elevational view illustrating a pressure tank suitable for use with the invention;

FIG. 5 is a plan view of the tank shown in FIG. 4;

FIG. 6 is a fragmentary section taken along the lines 6—6 of FIG. 4 on an enlarged scale, illustrating a suitable inlet baffle;

FIG. 7 is a detail showing a float baffle; and

FIG. 8 is a plan view illustrating the float baffle.

DESCRIPTION OF THE PREFERRED EMBODIMENTS

Referring to FIG. 1, the apparatus consists of an upright pressure tank 10 having its lower portion connected with inflow and outflow piping 11 and 12. The inflow piping 11 may include the gate valve 13. Venting means is associated with the upper portion of the tank 10 for effecting controlled venting off of air and consists of a vent valve 14 controlled by the inner float 15. The air passing through the vent line 16 is shown being delivered to a convenient sump. The uppermost showing of the float 15 represents a position which it assumes when the vent valve 14 is closed. With a drop in liquid level, the float may move to the indicated lower position, which serves to open the valve for delivering air through the line 16. A pilot valve 17 is disposed at a lower level and is provided with a float 18. This float is illustrated in three possible positions, the upper position representing closure of the pilot valve. The intermediate float position serves to position the pilot valve 17 in a particular manner to be presently described. The third and lowermost position of the float 18 likewise positions the pilot valve 17 for a particular function. Another vent pipe 19 connects with the upper portion of the tank and may likewise discharge to a sump. It is controlled by valve 21, which is actuated by an operator 22 of the pneumatic type that is spring biased toward closed position. Valve 21 is normally maintained closed, but is open when pneumatic pressure is applied.

An air supply line 23 is connected to an inlet port of pilot valve 17 and two outlet ports of this valve are connected respectively to the lines 24 and 25. Line 24 connects to the pneumatic operator 26 of the motor operated valve 27, which in turn is connected by line 28 to the pneumatic operator 22. Valve 27 is also shown connected by line 29 to the air supply pipe 23. When closed valve 27 vents air from operator 22 through line 28 to a sump as indicated.

A flow control valve 31 is connected in the piping portion 12 and may be one of the butterfly type. Its valve member is mechanically connected to the pneumatic operator 32, which in turn is connected by line 33 to the valve 34, and which is spring biased to close valve 31. Valve 34 is actuated by the pneumatic operator 35, which in turn is connected to the line 25 leading from the pilot valve 17. Valve 34 when open vents air from operator 32 to cause closing of valve 31. A needle valve 36 controls the rate of venting and thereby controls the closing rate of valve 31.

The present method and operation of the apparatus shown in FIG. 1 are as follows. It is assumed that the upstream piping is connected to a pump (e.g., a shipboard pump) which delivers liquid to piping 11 under pressure, but with some entrained air. Assuming that the valve 13 is open, flow is established through tank 10 and the downstream piping 12, with liquid rising in the tank 10 to a level where the pressure of separated air in the upper portion of the tank is equal to the static pressure of the liquid. Air separates from the liquid within the tank and accumulates in the upper portion. Assuming that the air is not removed, the level of liquid in the tank is lowered as the volume of air increases. If the liquid level in the tank is sufficient to maintain the vent valve 14 closed, then no air is vented from the tank. However, assumimg that the liquid level drops whereby the float 15 is lowered, then the vent valve 14 is opened to cause air to be vented through the line 16. In the event the rate at which air is vented off from the upper portion of the tank is sufficient to remove the air as rapidly as it is being separated from the liquid, whereby the liquid level does not fall below the level indicated by the indicated lower position of the float, then the other controlling means of the apparatus remains inactive. However, in the event the amount of air removed from the liquid causes further lowering of the liquid level to cause the float 18 to be lowered to its indicated intermediate position, then pilot valve 17 is actuated whereby air under pressure is delivered to the operator 26 through line 24 to cause valve 27 to be opened and air under pressure to be applied through line 28 to the pneumatic operator 22, with the result that valve 21 is opened to cause additional venting of air through the pipe 19. Under normal operation, the additional venting afforded by the float 18 and pilot valve 17 is sufficient to take care of normal operation of the system. However, in the event the liquid level, due to an undue amount of separated air, causes float 18 to drop to its lowermost indicated position, then the pilot valve 17 is conditioned whereby air under pressure is supplied through line 25 to the pneumatic operator 35 of the valve 34, and this valve in turn vents air from the operator 32 at a controlled rate through line 33, with the result that the flow control valve 31 is closed. The rate of venting and consequently the rate with which the valve 31 closes, can be regulated by the needle valve 36.

Closing of the flow control valve 31 permits liquid from the pump to continue to be supplied to the tank 10, thus raising the level of liquid within this tank until it has reached a level to lift float 18 or both floats 18 and 15. This serves to restore the vent valves 14 or both valves 14 and 22 to closed position. Venting from the operator 32 through line 33 is interrupted by closing of valve 34, with the result that air pressure builds up in the chamber of pneumatic operator 32 to cause valve 31 to be opened. Upon opening valve 31, the apparatus is restored to normal operation.

For given operating conditions the size of the tank 10 may be relatively small compared to an open air retention tank which might otherwise be used for air elimination. By taking into account various factors, a tank can be selected which will obtain proper air elimination under given operating conditions. The factors which should be taken into consideration include the time required for closing the valve 31 from full open position, the maximum flow rate as limited by the capacity of the metering apparatus employed, and the hydraulic surge pressure developed if the closing speed of the valve 31 is too rapid. The effective volume of the tank 10 is that extending from the lowermost level of float 18 to the effective outlet from the tank into the downstream pipe portion 12. By way of example, and assuming a 16 inch (outside diameter) pipeline having a mean flow rate of about 12,500 barrels per hour (145.8 gallons per minute), a closing time for valve 31 of 8 seconds, a normal closing time of valve 14 of 2 seconds, a closing time of valve 14 of 2 seconds, a maximum hydraulic surge of 25 pounds per square inch (assumed to require a 3 second damping at the above assumed line velocity), the effective volume of the tank 10 should be of the order of 2,200 gallons. This is relatively small when contrasted with conventional storage or retention tanks which under the same conditions would have a capacity of the order of 50,000 barrels (2,100,000 gallons).

It is desirable to provide baffling within the tank 10 to promote air separation and to prevent any direct bypassing of air from the inlet piping 11 directly to the outlet piping 12. The baffling shown in FIGS. 4–6 is suitable for this purpose and is constructed as follows. Within the tank and directly in front of the discharge from the inlet piping 11, there is a vertically extending V-shaped baffle 41 which is secured at its upper and lower ends to the horizontally extending plates 42 and 43. The extremities of these plates are secured to the adjacent side wall of the tank. Discharge from the inlet pipe 11 impinges upon the baffle 41, whereby the flow is divided into two laterally directed streams. Another vertically extending baffle 44 extends across the opening to the outlet piping 12, and its vertical side edges are secured to the walls of the tank. The lower edge of the baffle 44 terminates short of the bottom closure 10a of the tank. The upper edge of baffle 44 is secured to the plate 46 which extends horizontally and has its arcuate edge secured to the adjacent wall of the tank. With this arrangement, communication between the outlet piping 12 and the main interior of tank 10 is by way of the flow path 47 which is between the lower edge of the baffle 44 and the adjacent end closure 10a.

With baffling as described above, the discharge from pipe 11 is divided and caused to flow laterally and then upwardly. Flow from the tank to the outlet piping 12 occurs downwardly in front of the baffle 44 and then through passage 47 and upwardly behind the baffle to the outlet 12. With this arrangement of baffling, the effective volume of the tank extends down to the lower edge of the baffle 44.

In addition to the above described baffling, it is desirable to provide a baffle to protect float 15 from turbulence. This can be in the form of a horizontal channel-shaped baffle 48, which may be reinforced by downwardly extending ribs 49 along its side edges, and is perforated as shown. It is positioned to underlie the float 15.

In general, the method and apparatus just described greatly simplifies systems for unloading various liquid products such as petroleum oil from ships to shore storage installations. It dispenses with large storage and retention tanks for the elimination of air, and also additional pumps for discharging liquid from retention tanks through the meters. As distinguished from systems making use of relatively large retention tanks at atmospheric pressure for elimination of air, the present system can be described as being one making use of a reaction vessel which retains the line pressure and which effectively eliminates air from a liquid volume within the tank that is continually changing. In a conventional system the retention tank may for example have a capacity of 50,000 barrels, plus a first pump for delivering the liquid from the ship and a second pump for delivering the liquid from the retention tank through the meters. A system of comparable capacity according to the present invention may have a pressure tank having an effective volumetric capacity of only 2200 gallons, and employs only one pump which delivers the liquid from the ship through both the pressure tank and the meter without a holding time for air elimination.

The apparatus schematically illustrated in FIG. 2 is electrically controlled. The flow controlled vent valve 14 is the same as in FIG. 1. However, two floats 51 and 52 are shown in place of the single float 18 in FIG. 1, and these floats serve to condition the two electrical switches 53 and 54. The vent valve 21 is controlled by the electrical operator 55. The valve 31 in line 12 is likewise shown under the control of the electrical operator 56. The switches 53 and 54, together with the electrical operators 55 and 56, are included in electrical circuitry 57 and 58 supplied from the electrical power source 59.

Operation of the system shown in FIG. 2 is substantially the same as FIG. 1. Assuming that the level of liquid in the tank 10 drops below the level occupied by the float 15 in its raised position, then air is vented from the upper part of the tank. If such venting is not sufficient to stabilize the liquid level, then floats 51 and 52 are successively lowered to operate the switching means 53 and 54. Switching means 53 serves to energize the electrical operator 55 to open the vent valve 21. Lowering of float 52 operates the switching means 54 whereby the electrical operator 56 is energized to close the valve 31. After the valve 31 has been closed and the liquid level within the tank 10 has been restored, the valve 31 is automatically opened and operation continued.

The apparatus shown in FIG. 3 is controlled hydraulically. The float 18 operates the hydraulic pilot valve 61. Valve 21 is provided with a hydraulic operator 62 and a spring which normally biases valve 21 toward closed position. Valve 31 is operatively connected to the hydraulic operator 63 which is likewise spring urged toward closed position.

The hydraulic system connected with the operators 62 and 63 includes the three-way valve 64 which has a hydraulic operator 65, the normally open hydraulically operated pilot valve 66 and the valves 67 and 68. Hydraulic lines 69 and 70 connect with ports of the pilot valve 61, and lead respectively to the operater 65 of valve 64 and to the normally open hydraulic pilot valve 66. Line 71 connects with the valve 68 and to an inlet port of the pilot valve 61. Likewise valve 68 is connected by line 72 to the needle valve 75. Lines 73 and 74 are connected with the hydraulic pilot valve 66 to the operator 63 and to the outlet pipe line 12 respectively. The bypass valve 67 is connected between the lines 72 and 73. Liquid at upstream pressure is applied to lines 71 and 72 from the upstream side of valve 31 through valve 68.

In normal operation, valve 68 is open, valve 31 is open, and valves 14 and 21 are closed. When float 15 falls from its uppermost position by drop in the liquid level in tank 10, then valve 14 is opened to permit discharge of air. If this amount of venting is insufficient to maintain the liquid level, float 18 is lowered to its intermediate position to actuate the pilot valve 61 whereby hydraulic pressure is applied through the valve 64 to operator 62 to open the vent valve 21. In the event the liquid level falls to such a low value that the float 18 moves to its lowermost position, then pilot valve 61 causes the hydraulic liquid to be supplied through line 70 to the hydraulic pilot valve 66, whereby this valve is closed. This causes liquid pressure to be supplied to the operator 63, with the result that valve 31 is closed. As previously described, upon closing the valve 31, the liquid level within the tank 10 is restored, and as the level rises, float 18 is raised whereby the pilot valve 61 is positioned to restore the hydraulic pilot valve 66, thus permitting liquid from the operator 63 to vent through the valve 67.

What is claimed is:

1. A method for removing entrained free air or other gas from liquid flowing through piping at pressures above atmospheric, the piping having a closed tank interposed between inflow and outflow portions of the piping, the steps comprising causing liquid from the inlet portion normally to flow continuously into and through the tank and from the lower portion of the tank to the outer portion, maintaining a body of liquid within the tank which directly receives liquid from the inflow piping portion and from which liquid directly flows to the outflow piping portion, collecting and confining free air or other gases separating from the liquid in the tank in the upper portion thereof above the liquid level in the tank, thereby causing the collected air or other gas to be maintained at a pressure which is substantially equal to the pressure of the liquid body, liquid being discharged through the outflow portion of the piping by the pressure of the liquid body within the tank, and effecting controlled venting of air from the upper portion of the tank to maintain the liquid level in the tank between upper and lower limits.

2. A method as in claim 1 in which the venting of free air from the tank is controlled whereby venting is increased in response to a lowering of the liquid level in the tank.

3. A method as in claim 2 in which when the amount of accumulated air in the tank is such that the volume of liquid is reduced to a level below which air may re-enter the downstream piping, the flow through the outlet piping is arrested and is restored only after a substantial amount of accumulated air has been removed to restore the liquid level within normal limits.

4. Apparatus for the removal of free air or other gas from liquid flowing under pressure through piping, a pressure tank having its lower portion interposed between and having flow connections with inflow and outflow portions of the piping, means communicating with the upper portion of the pressure tank for venting air therefrom, means for controlling said venting means in response to changes in the level of liquid within the tank, and a valve interposed in the outflow portion of the piping, operating means for opening and closing said valve, and means for energizing said operating means to close said valve and shut off further flow of liquid from the pressure tank in response to level of liquid within the tank falling to an abnormally low level below which air may re-enter the downstream piping.

5. Apparatus for the removal of free air or other gas from liquid flowing under pressure above atmospheric through piping, an upright pressure tank having its lower portion connected to inflow and outflow portions of the piping, whereby liquid delivered into the lower portion of the tank from the inflow portion of the piping is free to flow out of the tank through the outflow portion of the piping, first and second venting means connected to the upper portion of the tank for venting air therefrom, first and second means responsive to the level of liquid within the tank for controlling said first and second venting means whereby when the body of liquid within the pressure tank falls below one predetermined level the first venting means is made effective to vent air from the upper portion of the tank and whereby when the liquid level falls below a predetermined level the second venting means is caused to vent air from the upper portion of the tank, a valve interposed in the outflow portion of the piping, operating means for opening or closing said valve, and means responsive to a third lower level of liquid for energizing said operating means to close said valve and shut off further flow of liquid from the pressure tank when the level of liquid within the tank falls below said third lower predetermined level.

6. Apparatus as in claim 5 together with means for controlling the rate of closing of said last named valve.

* * * * *